(12) United States Patent
Uchiyama et al.

(10) Patent No.: US 6,335,915 B1
(45) Date of Patent: Jan. 1, 2002

(54) OPTICAL PICKUP SENDING DEVICE

(75) Inventors: Kenji Uchiyama; Yasuo Ogiwara; Akihiro Muto; Tetsuya Uchiyama; Takashi Komiyama, all of Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/419,069

(22) Filed: Oct. 15, 1999

(30) Foreign Application Priority Data

Oct. 28, 1998 (JP) .......................................... 10-307134

(51) Int. Cl.⁷ .............................................. G11B 21/02
(52) U.S. Cl. ...................................................... 369/223
(58) Field of Search .................................. 369/223, 249, 369/219; 360/261.3, 266.6, 267.2–267.7

(56) References Cited

U.S. PATENT DOCUMENTS

| | | | | |
|---|---|---|---|---|
| 4,742,411 A | * | 5/1988 | Horio et al. ................. | 360/106 |
| 4,747,004 A | * | 5/1988 | Kukreja et al. ............. | 360/106 |
| 5,198,946 A | * | 3/1993 | Kurosawa .................... | 360/105 |
| 5,448,438 A | * | 9/1995 | Kasetty ....................... | 360/106 |
| 5,682,282 A | * | 10/1997 | Kato ............................ | 360/106 |
| 5,812,347 A | * | 9/1998 | Henke ......................... | 360/106 |
| 6,052,358 A | * | 4/2000 | Morikawa et al. .......... | 369/219 |

FOREIGN PATENT DOCUMENTS

JP 6-068619 * 3/1994

* cited by examiner

Primary Examiner—Brian E. Miller
(74) Attorney, Agent, or Firm—Arent Fox Kintner Plotkin & Kahn PLLC

(57) ABSTRACT

An optical pickup sending device comprises: an optical pickup for reading information from an information recording medium; a rack member provided in connection with the optical pickup; and a screwed shaft engaged with the rack member for sending the optical pickup along the screwed shaft. In particular, the rack member is formed with a plurality of curved teeth each having a radius of curvature larger than that of the screwed shaft.

14 Claims, 4 Drawing Sheets

OPTICAL PICKUP SENDING DEVICE

BACKGROUND OF THE INVENTION

The present invention relates to an optical pickup sending device for freely moving back and forth an optical pickup within an information recording/reproducing apparatus such as a disc player so as to read information from an information recording medium such as an optical disc.

There have been known several types of conventional pickup sending devices such as those disclosed in Japanese Utility Model Unexamined Publication No. 5-61861 and Japanese Patent Unexamined Publication No. 6-68619.

FIG. 6 is used to schematically indicate the structure of a conventional pickup sending device disclosed in Japanese Utility Model Unexamined Publication No. 5-61861. As shown in FIG. 6, the sending device comprises a pair of guide shafts 2 and 3 for slidably supporting an optical pickup body 1, a screwed shaft 4, a rack member 6 supported by two arm members 5 extending from the pickup body 1. The teeth 6a of the rack member 6 are engaged with the screwed shaft 4. When the screwed shaft 4 is rotated, a relative positional relationship between the teeth 6a and the screw shaft 4 will he changed, so as to cause the pickup body 1 to freely move back and fourth along the guide shafts 2 and 3, i.e., in a radial direction of an optical disc such as a CD (Compact Disc) mounted on a turntable (not shown).

With the pickup sending device shown in FIG. 6, although the rack member 6 is elastically urged by the screw shaft 4 through a least spring 6b provided in parallel with the arm members 5, since the teeth 6a of the rack member 6 are simply engaged with a part of the circumferential surface of the screwed shaft 4, an engagement between the teeth 6a of the rack member 6 and the screw shaft 4 is apt to collapse even due to a small vibration. As a result, it is difficult for the optical pickup 1 to read information from the optical disc in a correct manner and hence there will be some defects in the obtained information read by the optical pickup 1.

FIG. 7 is used to schematically indicate the structure of another conventional pickup sending device disclosed in Japanese Patent Unexamined Publication No. 6-68619. As shown in FIG. 7, the sending device comprises two guide shafts 8 and 9 for slidably supporting an optical pickup body 7 in a manner such that the pickup body 7 can be freely moved back and forth in the radio direction of an optical disc. A support member 10 is provided on the pickup body 7. The support member 10 has an engaging pin 12 provided at a front end thereof which is capable of engaging with a screw portion 11 formed integrally with the guide shaft 8. When the guide shaft 8 is rotated, a relative positional relationship between the engaging pin 12 and screw portion 11 will be changed, so as to cause the optical pickup body 7 to freely move back and fourth along the guide shafts 8 and 9.

With the pickup sending device shown in FIG. 7, since only the front end of the engaging pin 12 is engaged with the screw portion 11 of the shaft 8, an engagement between such two members 8 is apt to collapse even due to a small vibration. As a result, it is difficult for the optical pickup 7 to read information from the optical disc in a correct manner and hence there will be some defects in the obtained information read by the pickup 7.

In order to solve the problems existing in the above conventional devices shown in FIGS. 6 and 7, there has been suggested an improved structure shown in FIG. 8. Referring to FIG. 8, a half-nut 14 engaged with a screwed shaft 13, is integrally formed with a holding member 16 extending outwardly from the pickup main body 15. The inner diameter of the half-nut 14 is made almost the same as that of the screwed shaft 13, so that it is sure to prevent the half-nut 14 from getting off the screwed shaft 13.

However, if there is a relative deviation between a pair of guide shafts 17, 18 on one hand and the screwed shaft 13 on the other, an undesired gouging force will happen since it is difficult to absorb a dislocation caused by the above deviation between the screwed shaft 13 and the half-nut 14. As a result, there will he an unduly increased load on a driving motor (not shown) for driving the screwed shaft 13, hence undesirably causing an increase in the starting voltage of the driving motor.

SUMMARY OF THE INVENTION

It is an object of the present invention to provide an improved optical pickup sending device capable of solving the above-mentioned problems peculiar to the above-discussed prior arts.

According to the present invention, there is provided an optical pickup sending device, comprising: an optical pickup for reading information from an information recording medium; a rack member provided in connection with the optical pickup; and a screwed shaft engaged with the rack member for sending the optical pickup along the screwed shaft. In particular, the rack member is formed with a plurality of curved teeth each having a radius of curvature larger than that of the screwed shaft.

In one aspect of the present invention, the rack member is integrally formed with a holder so as to be supported thereby, said holder is engaged in a frame structure which is integrally formed with an arm member extending from he optical pickup and facing towards the screwed shaft.

In another aspect of the present invention, a coil spring is attached onto the holder in a manner such that the rack member is elastically urged against the screwed shaft.

The above objects and features of the present invention will become better understood from the following description with reference to the accompanying drawings.

DETAILED DESCRIPTION OF THE PREFERRED EMBODIMENTS

An embodiment of the present invention will be described in the following with reference to the accompanying drawings.

Figure 1:
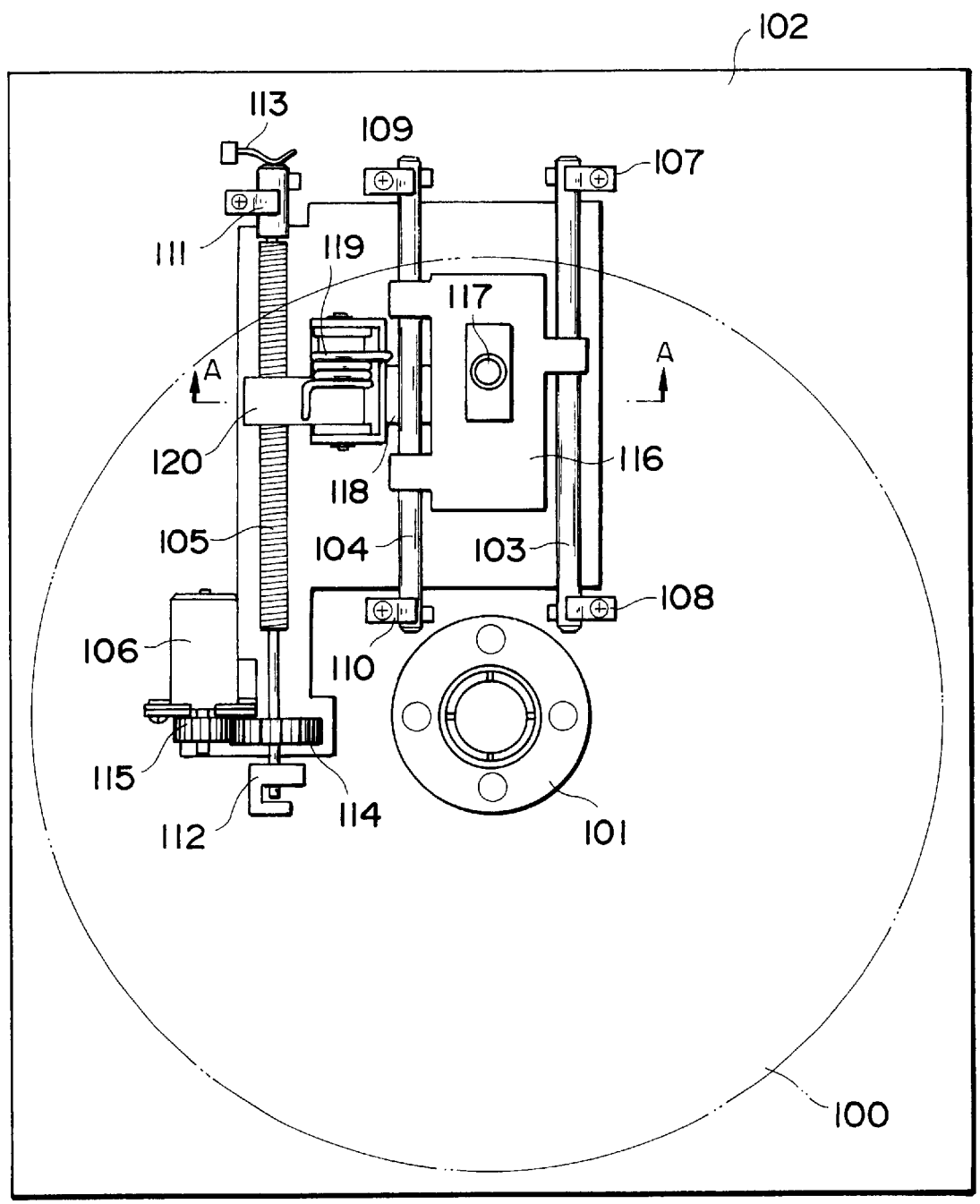
FIG. 1 is an explanatory plane view indicating the structure of an optical pickup sending device made according to the present invention.

FIG. 1 is an explanatory plane view indicating the structure of an optical pickup sending device made according the present invention.

In FIG. 1, reference numeral 100 is used to represent an optical disc such as CD (Compact Disc), DVD (Digital Video Disc or Digital Versatile Disc). Reference numeral 101 is used to represent a turntable provided on a chassis 102 for mounting the optical disc 100 when the optical disc is being reproduced or new information is being recorded thereon. Further, reference numerals 103 and 104 are used to represent a Pair of guide shafts disposed on the chassis 102. In addition, a screwed shaft 105 serving as a pickup sending means and a driving motor 106 are also provided on the chassis 102.

In detail, the guide shafts 103, 104 and the screwed shaft 105 are arranged in parallel with one another, with the guide shafts 103 and 104 fixed on the chassis 102 by means of fixing members 107–110. The screwed shaft 105 is rotatably supported by bearing members 111 and 112 which are fixed on the chassis 120.

In more detail, one end face of the screwed shaft 105 is elastically urged by a thrust member 113 consisting of a leaf spring, in a manner such that it is sure to prevent a possible vibration of the screwed shaft 105 in the longitudinal direction thereof. Further, a driven gear 114 engaged with a driving gear 115 for transmitting a driving force from a driving motor 106 to the screwed shaft 105, is secured on the screwed shaft 105.

An optical pickup body 116 is slidably supported on the guide shafts 103 and 104, an objective lens 117 (for emitting a light beam on to the information recording surface of the optical disk 100 and for collecting its reflected light so as to read information from the disc) is provided on the upper surface of the pickup body 116.

Further, an arm member 118 (FIG. 1 and FIG. 2) is provided extending from the pickup body 116 towards the screwed shaft 105, a rack member 120 is provided in connection with the arm member 118 in a manner such that it receives an elastic force from a coil spring 119 provided therebetween and thus gets in contact with the screwed shaft 105.

Figure 2:
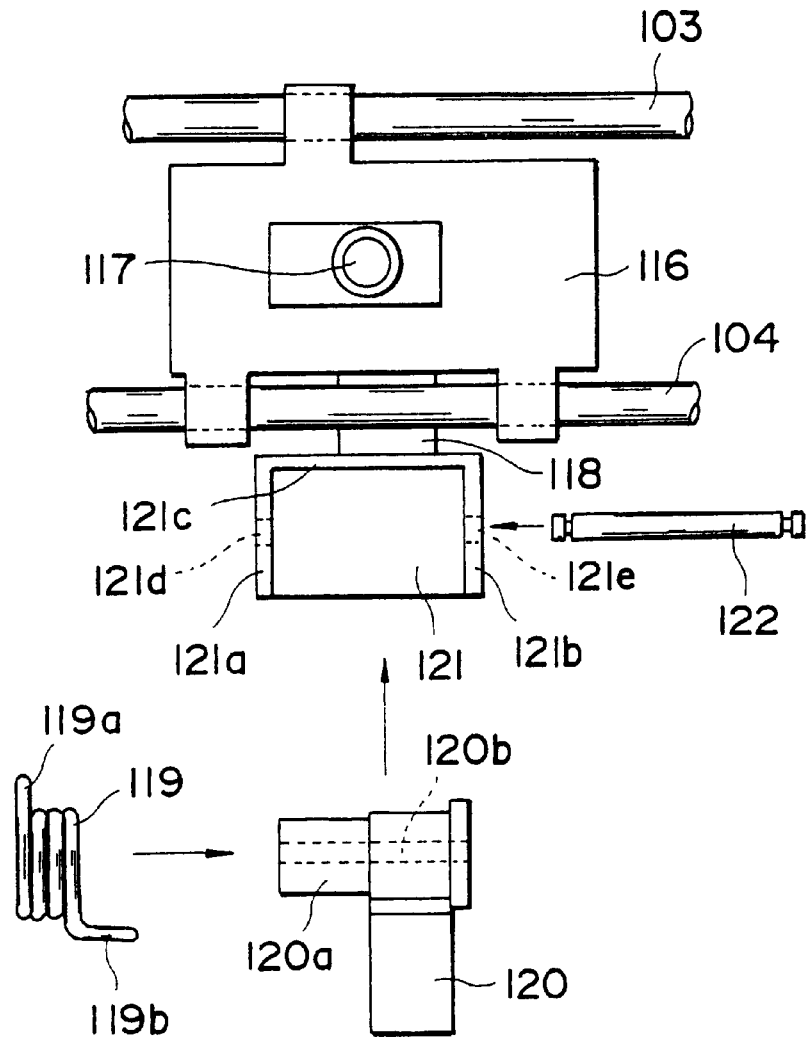
FIG. 2 is an exploded plane view indicating in more detail how a rack member may be attached to an optical pickup main body.
Figure 3:
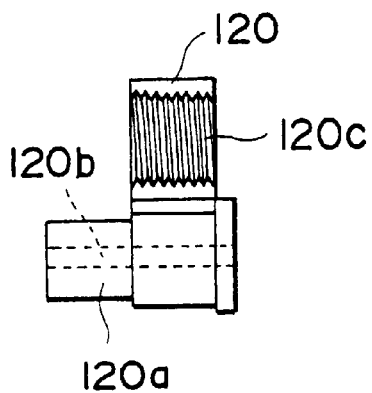
FIG. 3 is a back view indicating the rack member.
Figure 4:
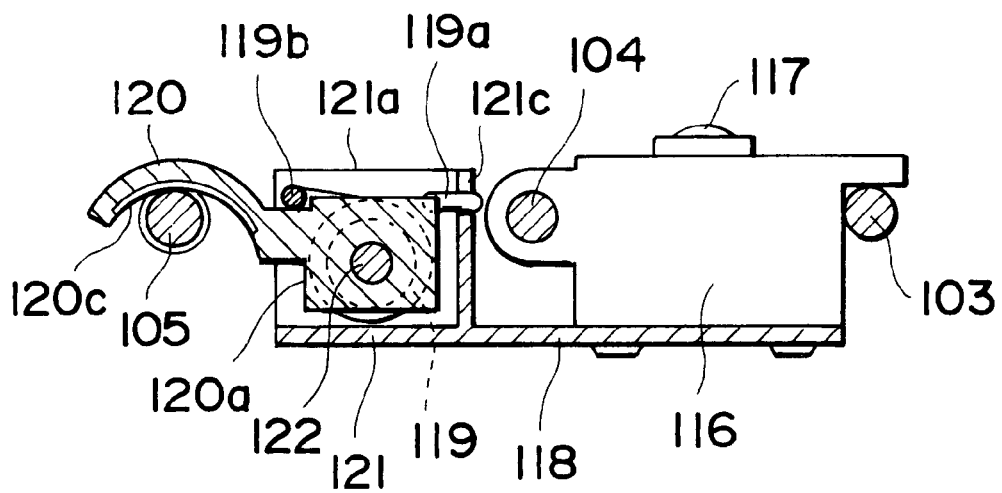
FIG. 4 is a longitudinally sectional view taken along A—A line in FIG. 1.

FIG. 2 is an exploded plane view indicating in more detail how a rack member 120 may be attached to the pickup body 116. FIG. 3 is a back view indicating the rack member 120. FIG. 4 is a longitudinally sectional view taken along A—A line in FIG. 1.

In FIG. 2, the arm member 118 extending from the pickup body 116 is integrally formed with a frame structure 121 which includes two mutually facing side walls 121a, 121b and one rear wall 121c. The side walls 121a and 121b are formed with through-holes 121d and 121e, and a support pin 122 is inserted there through.

The rack member 120 has an integrally formed holder 120a adapted to be engaged into the frame structure 121, an elongate through hole 120b allowing insertion of the support pin 122 is formed through the holder 120a. On the back surface of the rack member 120 there are formed curved teeth 120c capable of engaging with the screwed shaft 105.

Then, the holder 120a with the coil spring 119 wound thereon is engaged into the frame structure 121, with one end 119a thereof fixed on the rear wall 121c and the other end thereof on the rack member 120, so that the support pin 122 is inserted in the through holes 121d, 121e and elongated through hole 120b. In this way, as shown in FIG. 4, the rack member 120 may be attached in a proper position with respect to the pickup body 116, and will be elastically urged against the screwed shaft 105 by virtue of the coil spring 119.

Figure 5:
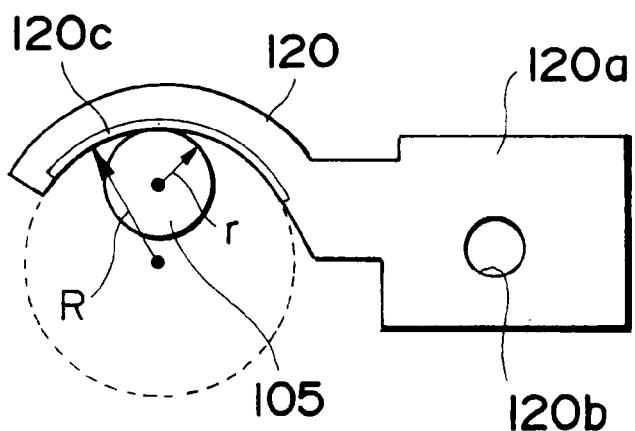
FIG. 5 is an explanatory view indicating an engaging relationship between a screwed shaft and the rack member.
Figure 6:
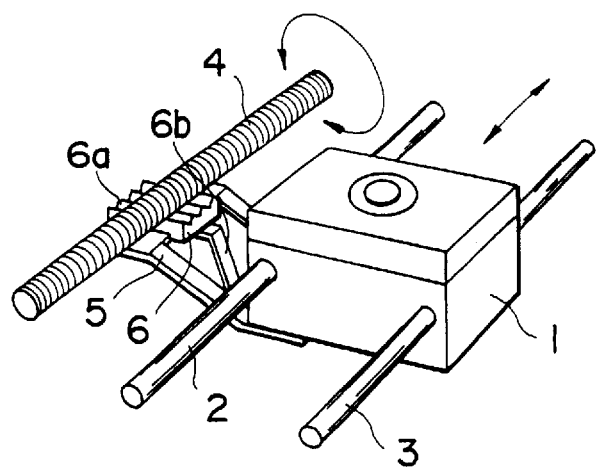
FIG. 6 is a perspective view indicating an optical pickup sending device made according to a prior art.
Figure 7:
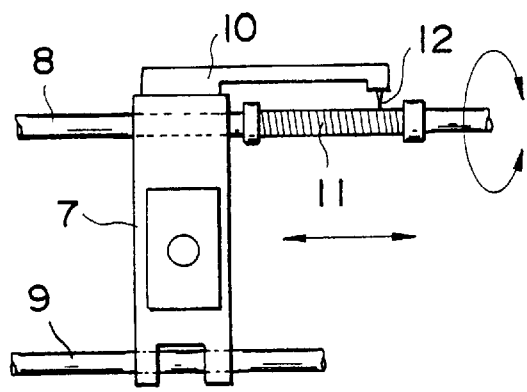
FIG. 7 is a plane view indicating another optical pickup sending device made according to a prior art.
Figure 8:
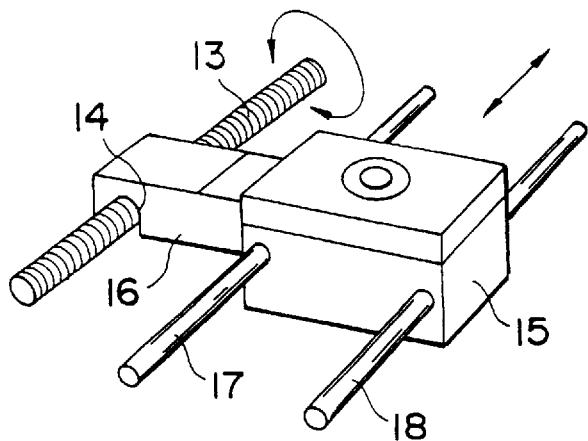
FIG. 8 is a perspective view indicating a further optical pickup sending device made according to a prior art.

In detail, as shown in FIG. 5, the semi-diameter R (radius of curvature) of the curved teeth 120c formed on the rack member 120 is set to be larger than the semi-diameter r (radius of curvature) of the screwed shaft 105, so that the screwed shaft 105 is allowed to be covered by the curved teeth 120c.

An operation of the optical pickup sending device having the above structure will be described in the following with reference to FIG. 1 and FIG. 4.

After an optical disc 100 is mounted on the turntable 101, the driving motor 106 is started so as to cause the rotation of the screwed shaft 105 through the gear 115 and the gear 114. For this reason, there will be a change in a relative positional relationship between the curved teeth 120c and the screwed shaft 105, thereby causing the pickup body 116 to move back and forth along the guide shafts 103 and 104 in the radial direction of the disc 100, thus enabling the optical pickup to read information from the information recording surface of the disc.

Here, since the curved teeth 120c has a larger semi-diameter than that of the screwed shaft 105, the screwed shaft 105 may be covered by the curved teeth 120c in the radial direction thereof, thereby making it possible to absorb a deviation or a dislocation possibly occurred in the engagement between the curved teeth 120c and the screwed shaft 105.

In this way, since it is sure to prevent a possible deviation or dislocation in the engagement between the curved teeth 120c and the screwed shaft 105, there will not be an unduly increased load on the driving motor 106, thus avoiding an undesired increase in the starting voltage of the driving motor.

Further, the pickup body 116 has a predetermined moving range depending upon the length of the guide shafts 103 and 104. However, when the pickup body 116 arrives at a terminal position closest to the turntable 101 or arrives at the opposite terminal position farthest from the turntable 101, since the curved teeth 120c will go beyond the teeth portion of the screwed shaft 105 against the elastic force of the coil spring 119, it is allowed to exactly prevent an unduly increased load on the driving motor 106.

In this way, with the use of the above embodiment, since a good and stable engagement may be maintained between the screwed shaft 105 and the rack member 120, the pickup body 116 is allowed to move back and forth in the radial direction of the disc 100 with an improved precision.

As may be understood from the above description, with the use of the optical pickup sending device made according to the present invention, since the rack member 120 is formed with curved teeth 120c which has a larger semi-diameter than that of the screwed shaft 105, even if a deviation or a dislocation occurs between the curved teeth 120c and the screwed shaft 105, such kind of deviation or dislocation will be effectively absorbed. For this reason, it is sure to prevent an undesired gouging force possibly occurred due to the above deviation or dislocation. Further, even if there is a vibration occurred between the rack member 120 and the screwed shaft 105, such a vibration will not cause the rack member 120 to move away from the screwed shaft 105. In this way, since a good and stable engagement may be maintained between the rack member 120 and the screwed shaft 105, the pickup body 116 may be moved in accordance with a rotating amount of the screwed shaft 105 in a more stable manner and with a higher precision.

While the presently preferred embodiments of the invention have been shown and described above, it is to be understood that these disclosures are for the purpose of illustration and that various changes and modifications may be made without departing from the scope of the invention as set forth in the appended claims.

What is claimed is:

1. An optical pickup sending device, comprising:

an optical pickup for reading information from an information recording medium;

a rack member provided in connection with the optical pickup, wherein the rack member has an arc-shaped part, said arc-shaped part having an interior arcuate surface having a center of curvature, and a threaded screw shaft engaged with said interior surface of the arc-shaped part for sending the optical pickup along the screw shaft, wherein a center of the screw shaft is at a point different from the center of curvature of the arc-shaped part and the center of the screw shaft being closer to the interior surface of the arc-shaped part than said center of curvature.

2. The optical pickup sending device according to claim 1, wherein the rack member is integrally formed with a holder so as to be supported thereby, said holder is engaged in a frame structure which is integrally formed with an arm member extending from the optical pickup and facing towards the screw shaft.

3. The optical pickup sending device according to claim 2, wherein a coil spring is attached onto the holder in a manner such that the rack member is elastically urged against the screw shaft.

4. The optical pickup sending device according to claim 1, wherein the rack member is pivotably connected to the optical pickup.

5. A rack apparatus for use with an optical pickup device slidably mounted for rectilinear movement on a recording and/or reproducing device having a motor-driven, threaded screw shaft having screw shaft center, the rack apparatus comprising:

a longitudinally extending rack member having a first end portion and an opposite second end portion connected to and projecting from the first end portion, the first end portion pivotably mounted to the optical pickup device and the second end portion having a concavity with a curved interior surface having a center of curvature and curved teeth segments formed into the curved interior surface of the second end portion, the curved teeth segments sized and adapted to extend across and matably engage with the threaded screw shaft; and a biasing element operative in conjunction with the rack member and the optical pickup sending device to bias the rack member such that the curved teeth segments are urged into matable engagement with the threaded screw shaft wherein the screw shaft center is at a point different from the center of curvature of the curved interior surface and the screw shaft center being closer to the curved interior surface than the center of curvature of the curved interior surface.

6. A rack apparatus according to claim 5, wherein the second end portion is arcuately shaped.

7. A rack apparatus according to claim 5, wherein the screw shaft has a screw shaft radius and the curved interior surface has an interior surface radius being larger than the screw shaft radius.

8. A rack apparatus according to claim 7, wherein the interior surface radius is larger than twice the screw shaft radius.

9. A rack apparatus according to claim 5, wherein the curved teeth segments extend generally longitudinally along the curved interior surface of the concavity.

10. An optical pickup apparatus, comprising:

a chassis;

an optical pickup device operative for at least one of reading and recording information from and onto an information recording medium and slidably mounted onto the chassis;

a threaded screw shaft mounted to the chassis and having a screw shaft center; and a rack member having a first end pivotably connected to the optical pickup device and a second end disposed opposite the first end and having a concavity with a plurality of curved teeth segments formed into the concavity, the concavity having a curved interior surface with a center of curvature, the curved teeth segments being resiliently biased into engagement with the threaded screw shaft wherein the screw shaft center is at a point different from the center of curvature of the curved interior surface and the screw shaft center being closer to the curved interior surface than the center of curvature of the curved interior surface.

11. An optical pickup apparatus according to claim 10, further comprising a spring element operably connected to the rack member and the optical pickup device for resiliently biasing the curved teeth segments into engagement with the threaded screw shaft.

12. An optical pick apparatus according to claim 10, further comprising a thrust member mounted to the chassis and in contact with an end of the threaded screw shaft in order to elastically urge the threaded screw shaft in a first longitudinal direction to inhibit rectilinear movement of the threaded screw shaft in a second longitudinal direction being opposite the first longitudinal direction.

13. An optical pickup apparatus according to claim 10, further comprising a motor operative to impart rotational movement to the threaded screw shaft when the rack member is engaged therewith in order to cause the rack member to move rectilinearly thereby causing the optical pickup device to slidably move rectilinearly along the chassis.

14. An optical pickup apparatus according to claim 10, wherein the pickup device includes an optical pickup body, a holder and an arm member, the arm member interposed between and interconnecting the optical pickup body and the holder, the holder sized and adapted to pivotably receive the rack member.

* * * * *